Jan. 18, 1938.          A. F. INDRIERI          2,105,886
SPRING MOTOR AND REFRIGERATOR DRIVE
Filed April 1, 1936          4 Sheets-Sheet 1
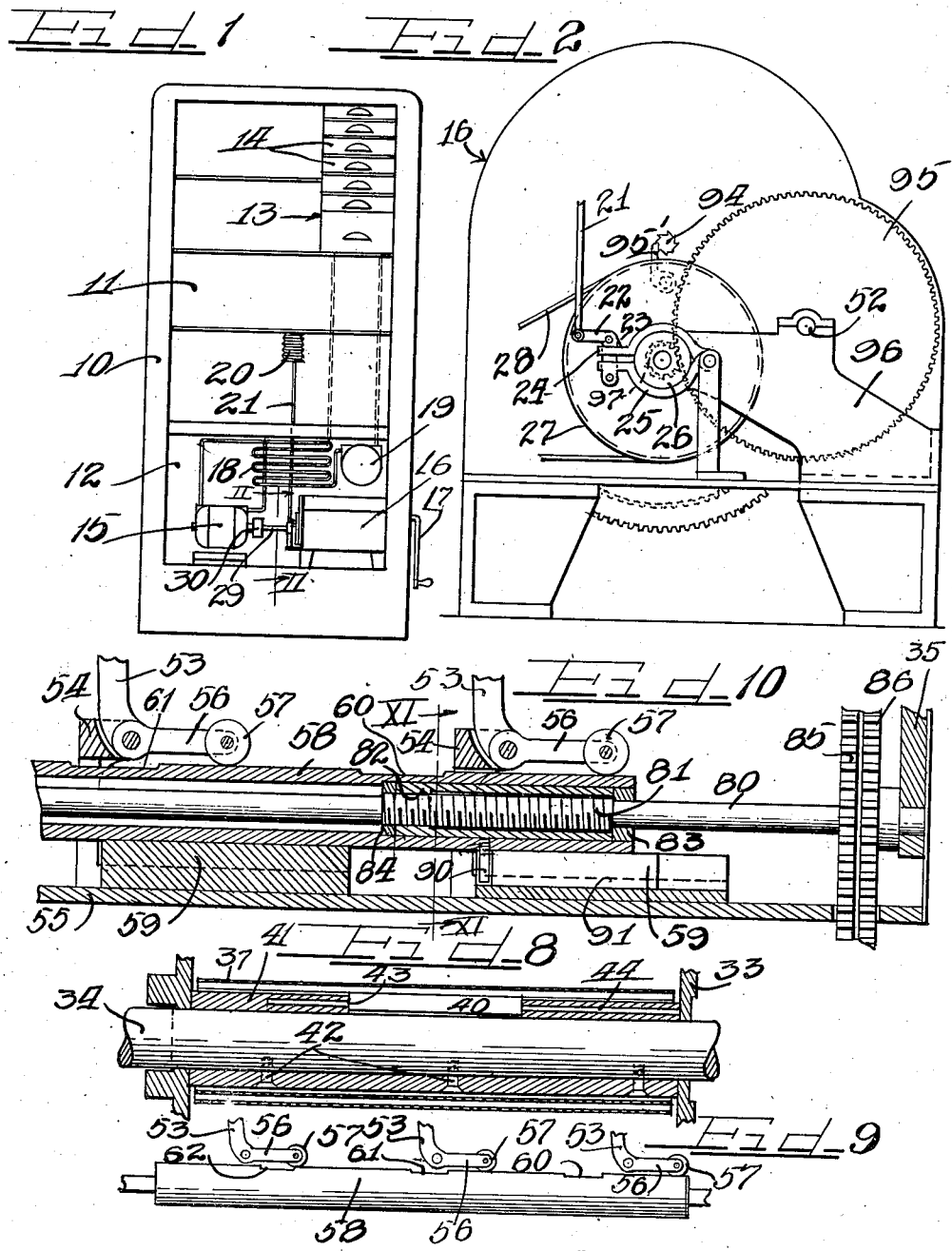
Inventor
Alexander F. Indrieri
by Charles H. Hill Attys.

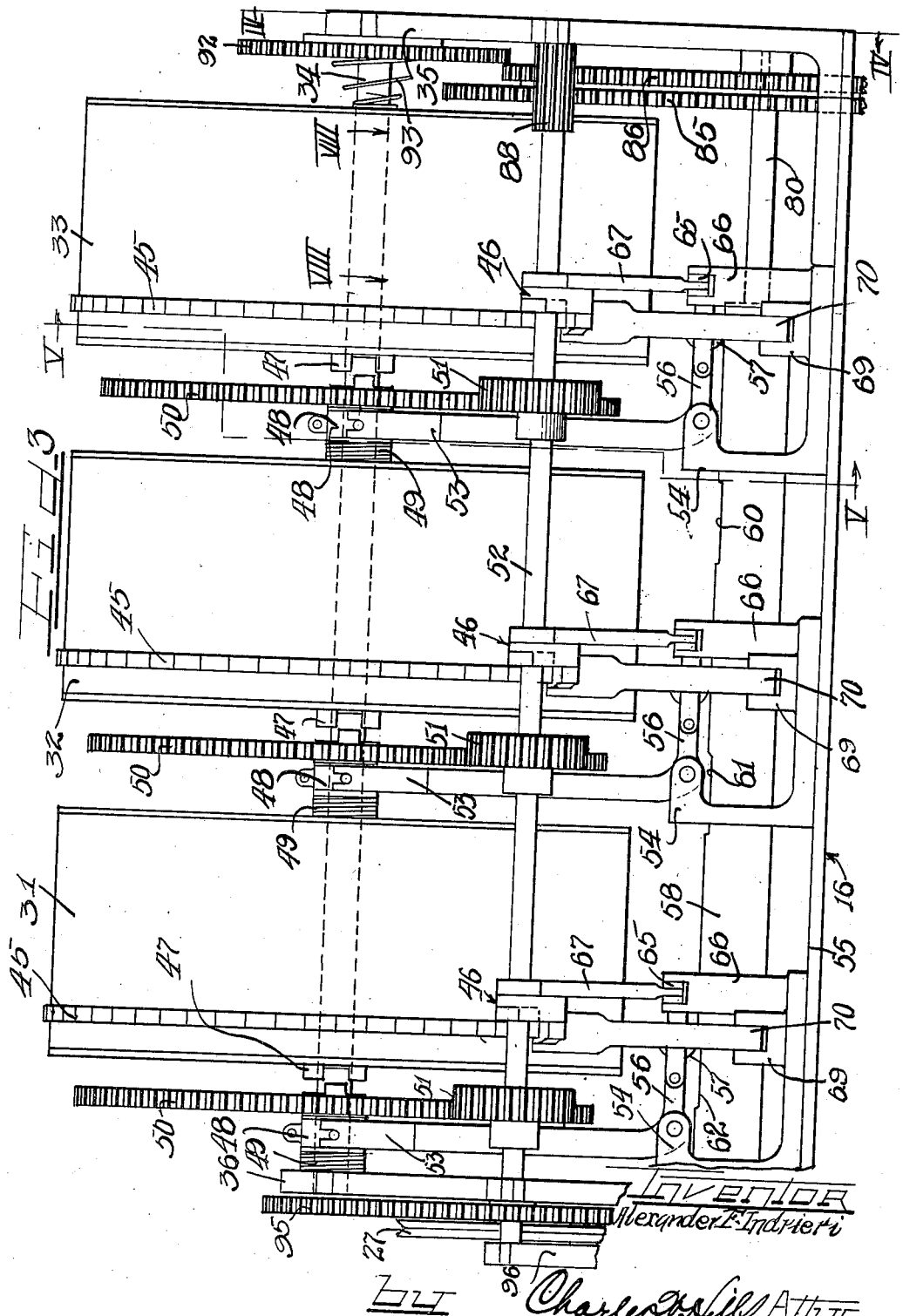

Jan. 18, 1938. A. F. INDRIERI 2,105,886
SPRING MOTOR AND REFRIGERATOR DRIVE
Filed April 1, 1936 4 Sheets-Sheet 3
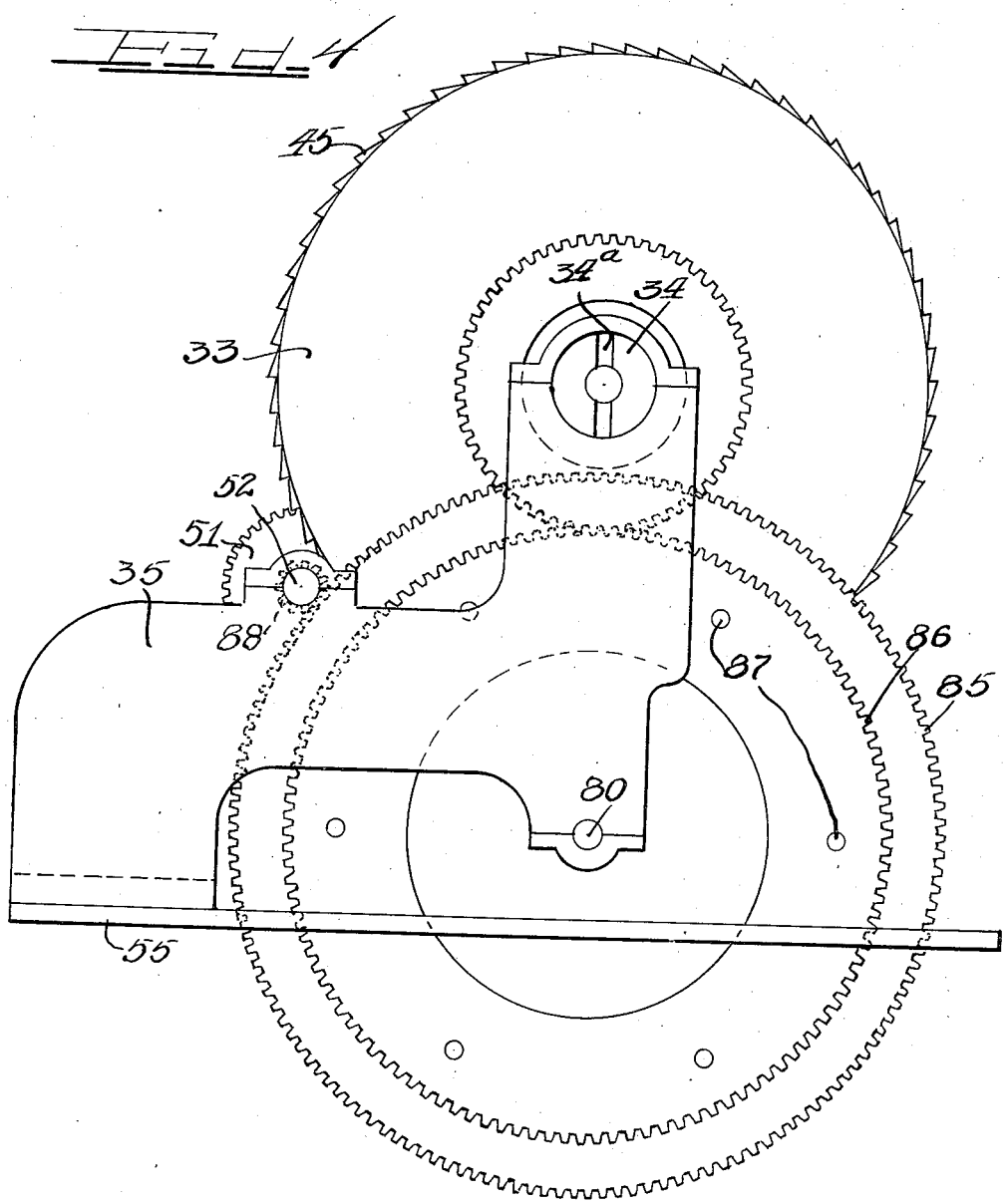
Inventor
Alexander F. Indrieri.
by Charles W. Hill
Atty.

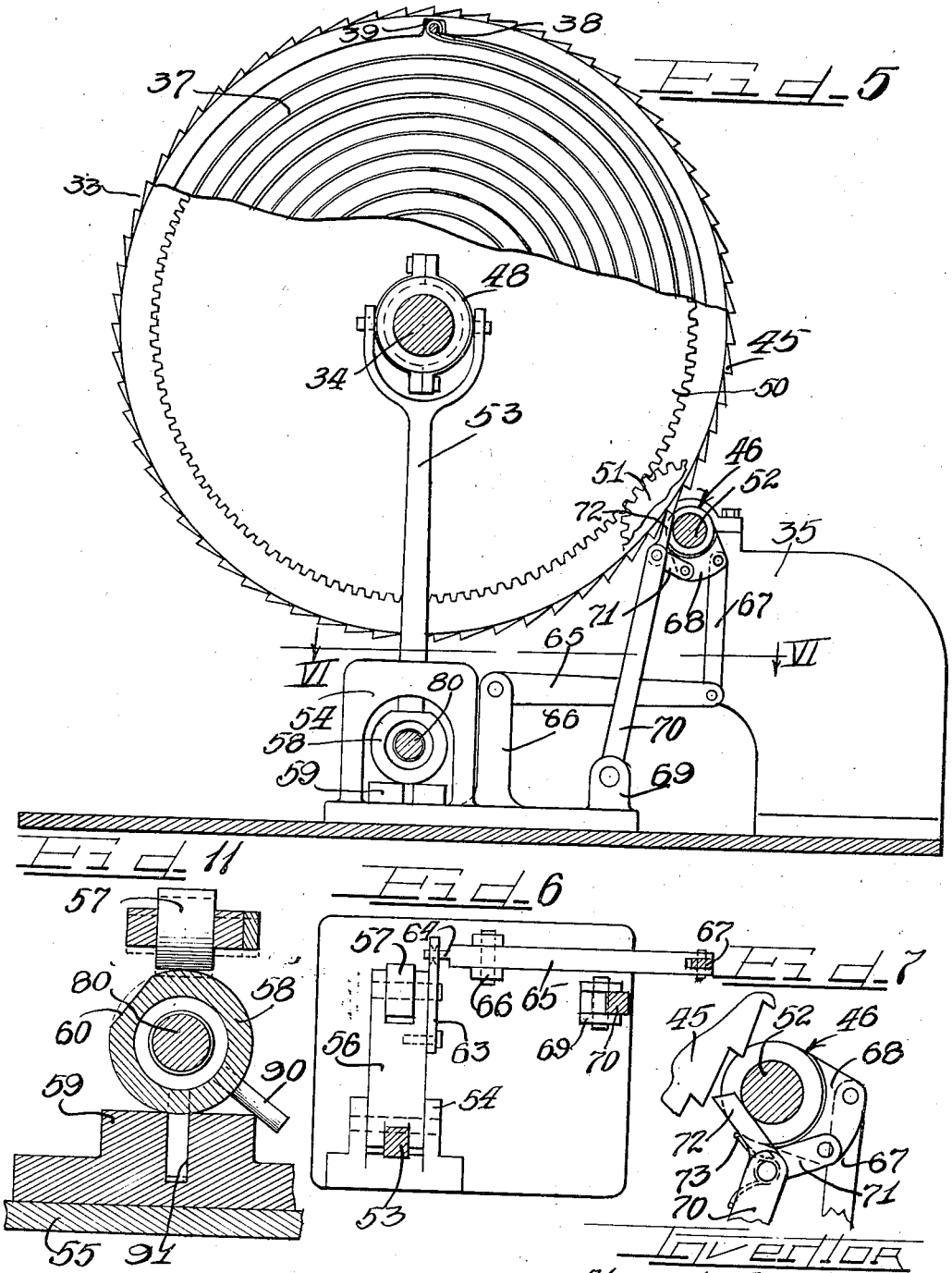

Patented Jan. 18, 1938

2,105,886

UNITED STATES PATENT OFFICE 2,105,886

SPRING MOTOR AND REFRIGERATOR DRIVE

Alexander F. Indrieri, Chicago, Ill., assignor of two percent to Edgar Bernhard, and fifteen percent to Dominick Petruzzelli and Vito Scavo, all of Chicago, Ill.

Application April 1, 1936, Serial No. 72,007

2 Claims. (Cl. 185—40)

This invention relates to a mechanical refrigerator unit actuated by a spring motor and includes a novel spring motor for driving the compressor of the unit.

More specifically this invention relates to a spring motor having a plurality of individually mounted spiral springs which are wound as a single unit but are successively unwound as separate units to deliver a constant amount of power over a prolonged time period.

In many localities where public utilities are not available or are prohibitive in price it is desirable to have a mechanically driven refrigerator unit that will operate over a prolonged period of time from energy stored therein in a comparatively short period of time. Even in localities where public utilities are available and not excessive in cost it is desirable to further reduce the cost of operating mechanical refrigerators by storing up energy in a spring motor in a short period of time from an electrically driven motor and to use this stored up energy over a prolonged period of time without operating the motor. This cycle of operation greatly reduces the power consumption since the electric motor is only used once in a long period of time whereas without the use of the spring motor the electric motor would be intermittently driven at frequent intervals.

It is therefore an object of this invention to provide a self-contained mechanical refrigerator unit that can be operated over a long period of time from energy stored therein in a short period of time.

A further object of this invention is to provide a spring motor driven evaporator unit that can be operated without heat or electrical energy.

A further object of this invention is to provide an efficiently operated spring motor that can be wound in a short time.

A further object of this invention is to provide a spring motor containing a plurality of individual springs that can be wound as a unit.

A further object of this invention is to provide improved mechanism for timing the operation of separate springs in a multiple spring motor.

Other and further objects of this invention will become apparent from the following detailed description of the annexed sheets of drawings which disclose preferred embodiments of the invention.

On the drawings:

Figure 1 is a front elevational view of a refrigerator unit according to this invention driven by a spring motor of this invention.

Figure 2 is an enlarged view of the refrigerator drive mechanism taken along the line II—II of Figure 1.

Figure 3 is a greatly enlarged side elevational view of the spring motor of this invention.

Figure 4 is an end elevational view of the spring motor taken along the line IV—IV of Figure 3.

Figure 5 is a cross-sectional view taken along the line V—V of Figure 3.

Figure 6 is a cross-sectional view taken substantially along the line VI—VI of Figure 5.

Figure 7 is an enlarged elevational view of the trip mechanism shown in Figure 5.

Figure 8 is an enlarged fragmentary cross-sectional view, with parts in elevation, showing the manner in which the springs are secured to the winding shaft.

Figure 9 is a longitudinal view of the cam and rollers used for controlling the operation of the springs.

Figure 10 is an enlarged cross-sectional view taken longitudinally along the cam as shown in Figure 9.

Figure 11 is a cross-sectional view taken substantially along the line XI—XI of Figure 10.

As shown on the drawings:

In Figure 1 the reference numeral 10 indicates generally a refrigerator cabinet defining a cold storage space 11 and a compressor compartment 12 separated therefrom. The space 11 contains the usual evaporator unit indicated generally at 13 for defining a sharp freezing space to receive a plurality of ice trays 14.

The space 12 contains a compressor pump 15 driven by a spring motor 16 according to this invention. The spring motor is manually wound by means of a crank 17. Refrigerant from the compressor 15 is flowed through a condenser 18 into a receiver 19 where it is collected for use as needed in the evaporator 13. The expanded refrigerant from the evaporator 13 flows back to the compressor 15.

Since the refrigerator unit of this invention is actuated entirely by energy stored up in the spring motor 16 a mechanically operated thermostat device is provided to stop the spring motor 16 when the storage compartment 11 is cooled below a predetermined temperature. The thermostat device comprises a bellows type valve 20 mounted within the storage space 11 and having a rod 21 extending therefrom into the compressor compartment 12. The rod 21, as best shown in Figure 2, is pivoted to a lever 22 having a cam head 23 adapted to act against a brake arm 24 to compress a brake 25 against a driven stub shaft 26. This braking action is sufficient to stop the spring motor and the brake is actuated by a contraction of the bellows 20 due to a lowering of the temperature within the storage compartment 11. The bellows 20 if desired may be filled with an expansible fluid.

The stub shaft 26 which is driven by the motor 16 has a pulley 27 secured thereon for driving a belt 28 which drives the compressor shaft 29. A free wheeling clutch 30 (Figure 1) is connected between the compressor shaft 29 and the compressor as indicated so that the compressor will not be driven when the spring motor 16 is wound by the crank 17.

As shown in Figure 3 the spring motor 16 comprises a plurality of housings or casings 31, 32, and 33 for spiral springs. The casings 31, 32, and 33 are freely rotatable about a supporting shaft 34 which is carried at its ends in frame plates 35 and 36.

As shown in Figures 5 and 8 each casing 31, 32, and 33 contains a flat spiral spring 37 pinned at its outer end to the inner periphery of the casing by means of a pin 38 extending through a looped end 39 of the spring.

The inner end of the spring 37, as shown in Figure 8, is provided with a tab 40 at the center portion thereof which is bent in the form of an eye. A sleeve 41 is disposed over the supporting shaft 34 within each casing and is secured to the shaft by means of bolts 42. The sleeve 41 has a notch 43 cut therein for receiving the tab 40 of the spring 37. A hole is drilled longitudinally of the sleeve 41 for receiving a pin 44 therethrough which pin holds the tab 40 securely on the sleeve 41 and thus secures the spring 37 at its inner end to the sleeve 41. In this manner it is obvious that a winding of the shaft 34 to rotate the sleeve 41 will effect a tightening of the spring 37 within each of the casings 31 to 33 provided that these casings are prevented from rotating. The shaft 34 can be wound by means of the crank 17 which as shown in Figure 4 can engage a pin 34a extending through the shaft 34.

In order to prevent the casings 31 to 33 from rotating during the winding operation or during their stages of inactivity in the operation of the motor each casing is provided with a toothed ring or rim 45 secured therearound for engaging with a pawl trip device 46 as shown in Figures 5 and 7.

Each casing 31 to 33 also carries a dog clutch member 47 adapted to receive dog clutches 48 slidable on the shaft 34. Each clutch 48 is urged into the clutch members 47 on the casing by a compressed coil spring 49 urged against the clutches.

Each clutch 48 also carries a large gear 50 adapted to rotate whenever the clutches are engaged with the casings. The gears 50 mesh with small pinion gears 51 on a driven shaft 52 carried in the end members 35 and 36 alongside of the spring casings.

Each clutch 48 has a yoke arm 53 extending therefrom as best shown in Figures 3 and 5 for engaging and disengaging the clutches 48 with the clutch members 47 carried by the casings. The arms 53 are pivoted in brackets 54 resting on the base plate 55 of the motor as shown in Figure 3.

As best shown in Figures 3 and 6 the arms 53 have horizontal fingers 56 extending from the bottoms thereof and carrying rollers 57 at their ends. The rollers 57 ride along a cylindrical cam sleeve 58 which is slidable along the bottom of the motor on blocks 59 mounted under the brackets 54. The cam sleeve 58 has three depressions or grooves 60, 61, and 62 cut along the top thereof at the proper spaced intervals from each other so that each roller 57 will drop into its groove in the proper sequence to permit the compressed coil springs 49 to urge the clutches 48 into engagement with their respective spring casings. When the fingers 56 of the arms 53 are riding on top of the cam sleeve 58 the clutches are disengaged but as soon as the rollers on the ends of the fingers drop into a groove on the cam sleeve the clutches are engaged because the fingers 56 drop from the horizontal thereby permitting a movement of the arms 53 from the vertical.

Whenever a clutch 48 engages with its spring casing it is necessary that the pawl retaining device 46 be released from that casing so that the spring therein can drive the clutch to rotate its gear and thereby deliver power to the driving shaft 52. The pawl device 46 must therefore be operated simultaneously with the engaging of a clutch 48. This is done, as shown in Figures 5, 6, and 7 by securing an arm 63 (Figure 6) on each of the fingers 56 of the clutch arms 53. The arms 63, as shown in Figure 6, are pinned to a tail 64 of a link member 65 which is pivoted in a standard 66. The link 65 in turn is pivoted to another link member 67 which is, in turn, pivoted to a cam member 68 which is freely rotatable on the drive shaft 52.

A second standard 69 pivotally supports another link member 70 carrying a shorter link member 71 at its upper end thereof, which member 71 is pivoted to the cam member 68. The link member 70 likewise carries a pawl 72 which engages the teeth of the toothed ring 45. The pawl is urged to extend straight outwardly from the link member 70 by a spring 73 (Figure 7) but is adapted to be rotated about the pivot in the end of the member 70.

Now when the arms 63 are moved downwardly as when the rollers 57 drop into their grooves or notches on the cam sleeve 58 the tail 64 of the link 65 moves downward but the other end of the link moves upward to move the connecting link 67 upward and thus rotate the cam 68 in a counterclockwise direction about the shaft 52. This rotation of the cam 68 however also moves the link 71 in a counterclockwise direction thereby rotating the pawl 72 downward and away from the teeth of the ring 45. This downward and outward movement of the trip mechanism is very important since it provides for the releasing of the casing members without undue friction or binding.

The cam sleeve 58 has a shaft 80 extending therethrough and supported at its ends in the end frames 35 and 36. The shaft 80 is threaded intermediate the ends thereof as at 81 (Figure 10) and is in screw thread engagement with an internally threaded sleeve 82 which is pressed in the cam sleeve 58. Retaining collars 83 and 84 are tightly seated within the cam sleeve 58 to further lock the sleeve 82 against any movement relative to the cam sleeve 58.

A pair of gears 85 and 86 are keyed to the shaft 80 just inside the frame member 35. These two gears are pinned together by means of pins 87 (Figure 4). The larger gear 85 engages with a pinion gear 88 keyed on the driving shaft 52. Thus as the driving shaft 52 rotates, the gear 88 thereon rotates the gear 85 to turn the shaft 80 thereby causing the cam sleeve 58 to be moved horizontally since the shaft 80 is in threaded engagement with the sleeve 82 carried by the cam shaft.

This horizontal movement of the cam sleeve is properly timed so as to bring the notches 60, 61, and 62 under their rollers 57 in the proper sequence to engage the clutches 48 thereby bringing a tightly wound spring within the casings 31, 32, and 33 into operation to continue driving the shaft 52.

As shown in Figure 3 the end roller 57 is just entering into the groove 62 of the cam sleeve 58 to engage the casing 31 with its clutch 48 and to release the braking mechanism 46. The spring within the casing 31 will then drive the shaft 52 until it is unwound. As the spring approaches its unwound condition, however, the cam sleeve 58 has in the meantime moved to bring the groove or slot 61 therein under the second roller 57 thereby engaging the second clutch 48 with the casing 32. When the second clutch is engaged the first clutch is disengaged and the first pawl mechanism relocked with the casing 31 since the first roller 57 has now passed out of the groove 62. This relocking of the casing 31 is desirable since the spring therein is not completely unwound and if permitted to further unwind after the second spring is released an uneven amount of power would be delivered. The spring in the casing 32 then continues the driving of the shaft 52 through its gears 50 and 51. This action continues until the spring in the third or last casing 33 is engaged and unwound. At this time the energy stored within the spring motor is substantially spent and the sleeve 58 will be moved to the end of its operating stroke.

It is then necessary to wind the motor. For the winding operation it is desirable to wind all three of the springs within the casings 31, 32, and 33 at the same time although these springs are operated successively in the driving operation. In order to wind all three of the springs at the same time it is necessary that all of the clutches 48 be disengaged. For this purpose as shown in Figures 10 and 11, a pin 90 is carried by the cam sleeve 58 at the bottom thereof for riding in a groove 91 formed in an end supporting block 59. When the sleeve 58 reaches the end of its driving stroke, this pin 90 will emerge from the groove 91 at the end of the slot and can be manually turned as shown in Figure 11 to rotate the sleeve 58 so that all of the grooves or slots therein will be out of engagement with the rollers 57. As a result all of the rollers will be raised from the position shown in dotted lines in Figure 11 to the position shown in solid lines and the clutches 58 will all be disengaged.

As shown in Figure 3 a gear 92 is slidably keyed on the main supporting shaft 34 and is urged toward the end frame member 35 by a coil spring 93. During the winding operation, however, an insertion of the crank 17 (Figure 1) effects a sliding of the gear 92 against the spring pressure 93 to mesh with the gear 86. The shaft 34 is then rotated by the crank to rotate each of the sleeves 41 (Figure 8) to which the inner ends of the springs 37 are secured in their respective casings 31 to 33. Since each of the clutches 48 are disengaged the pawl devices 46 are locked against the ring members 45 on the casings to prevent the casings from rotation. A rotating of the shaft 34 will therefore wind each of the springs 37 in the respective casings at the same time. In order to prevent an unwinding of the shaft 34 during the winding operation a ratchet wheel 94 (Figure 2) can be secured on the end of the shaft to engage with a pawl 95' carried by the frame member of the motor. The shaft 34 is thus locked against movement in one direction.

During the winding operation, however, the gear 86 is causing a rotation of the shaft 80 to move the cam sleeve 58 back to its starting position.

When the springs 37 are fully wound the cam sleeve 58 will be in a position shown in Figure 3 wherein the end roller 57 is entering the slot or groove 62 on the sleeve to engage the end clutch 58 with the casing 31. The end pawl member 46 is then disengaged simultaneously with the engaging of the end clutch 48 and the end gear 50 will drive the driving shaft 52.

Since it is desired to deliver a high speed of rotation from the motor a large gear 95 is keyed to the end of the shaft 52 and carried behind a supporting frame 96. The gear 95 meshes with a small gear 97 secured on the stub shaft 26 which shaft drives the pulley 27.

From the above description it should be understood that a compressor pump in a mechanical refrigerator system can according to this invention, be driven by energy stored in the spring motor of this invention. The system can operate for a day or longer from energy stored in the motor by several minutes of winding. The spring motor, of course, is adapted for many other uses and the invention is not limited to any specific use of the motor. The invention however does include a thermostat brake or control for starting and stopping the spring motor in a refrigerator drive installation.

I am aware that many changes may be made and numerous details of construction may be varied through a wide range, without departing from the principles of this invention, and I, therefore do not purpose limiting the patent granted hereon otherwise than is necessitated by the prior art.

I claim as my invention:

1. A spring motor comprising an elongated supporting and winding shaft rotatably secured at its ends in a frame structure, a plurality of cylindrical casings freely rotatable around said shaft, spiral springs in each of said casings affixed to the shaft at the inner ends thereof and to the casings at the outer ends thereof, dog clutch members carried by the sides of each of the casings, dog clutches slidably mounted on the shaft for engaging the clutch members, gears carried by said clutches, a drive shaft mounted alongside of said casings, gears on said drive shaft meshing with the clutch gears, means on said drive shaft for locking the casings against rotation, a cam sleeve slidably mounted beneath the casings, and means riding on said cam sleeve for engaging and disengaging the clutches and for releasing the casing locking means.

2. In a spring motor containing a plurality of spiral springs adapted to be wound simultaneously and unwound successively, timing mechanism for operating the springs comprising a cam sleeve having notches cut in the periphery thereof in spaced longitudinal relation, rollers riding on the sleeve, clutches and locking mechanisms for the springs controlled by the position of the rollers, and means driven by the springs for moving the cam sleeve longitudinally of its axis whereby the rollers will move in and out of the notches to successively release the springs and operatively connect the released springs to drive the motor.

ALEXANDER F. INDRIERI.